United States Patent

Kirby et al.

[11] Patent Number: 5,828,846
[45] Date of Patent: Oct. 27, 1998

[54] CONTROLLING PASSAGE OF PACKETS OR MESSAGES VIA A VIRTUAL CONNECTION OR FLOW

[75] Inventors: Alan J. Kirby, Hollis, N.H.; Ashok P. Nadkarni, Shrewsbury, Mass.

[73] Assignee: Raptor Systems, Inc., Waltham, Mass.

[21] Appl. No.: 561,790

[22] Filed: Nov. 22, 1995

[51] Int. Cl.$^6$ .................................................. G06F 13/00
[52] U.S. Cl. ................................. 395/200.68; 370/351
[58] Field of Search .................... 395/200.01, 200.12, 395/200.15, 840–841, 853–855, 200.3, 200.57, 200.68; 370/218, 252, 397, 399, 254, 402, 409, 464, 351; 340/825, 825.03, 826; 380/3, 4; 711/163, 164

[56] References Cited

U.S. PATENT DOCUMENTS

| | | | |
|---|---|---|---|
| 5,099,517 | 3/1992 | Gupta et al. | 380/29 |
| 5,161,193 | 11/1992 | Lampson et al. | 380/49 |
| 5,235,644 | 8/1993 | Gupta et al. | 380/48 |
| 5,535,336 | 7/1996 | Smith et al. | 395/200.06 |
| 5,553,060 | 9/1996 | Obermanns et al. | 370/218 |
| 5,583,862 | 12/1996 | Callon | 370/397 |
| 5,623,605 | 4/1997 | Keshav et al. | 395/200.17 |
| 5,633,861 | 5/1997 | Hanson et al. | 370/232 |

OTHER PUBLICATIONS

World Wide Web document of Digital Equipment Corporation's tunneling product, Jan. 1996.

Kerberos Network Authentication Service (V5), Digital Equipment Corporation, pp. 1–106, Sep. 1993.

swIPe IP Security Protocol, Columbia University and AT&T, John Ioannidis and Matt Blaze, Dec. 1993.

Security Architecture for the Internet Protocol, R. Atkinson, Naval Research Laboratory, pp. 1–44, Aug. 1995.

IP Authentication Header, R. Atkinson, Naval Research Laboratory, pp. 1–26, Aug. 1995.

IP Encapsulating Security Payload (ESP), R. Atkinson, Naval Research Laboratory, pp. 1–24, Aug. 1995.

The Photuris Session Key Management Protocol, P. Karn, Qualcomm, W.A. Simpson, DayDreamer, pp. 1–106, Nov. 1995.

Simple Key–Management For Internet Protocols (SKIP), Ashar Aziz, et al. Sun Microsystems, Inc., pp. 1–72, Dec. 1995.

Internet Security Association and Key Management Protocol (ISAKMP), Douglas Maughan and Mark Schertler, National Security Agency, pp. 1–117, Nov. 1995.

*Primary Examiner*—Alpesh M. Shah
*Attorney, Agent, or Firm*—Fish & Richardson P.C.

[57] ABSTRACT

Passage of packets or messages is controlled between a device and a network via a virtual connection or flow which conforms to a predefined communication protocol. In connection with processing a packet or message that triggers a step in managing the virtual connection or flow, predefined authorization rules are applied to determine whether to permit the step to occur. In connection with processing a packet or message that does not trigger a step in managing the virtual connection or flow, the packet or message is permitted to pass directly via the virtual connection or flow, without applying the predefined authorization rules.

14 Claims, 9 Drawing Sheets

CONTROLLING PASSAGE OF PACKETS OR MESSAGES VIA A VIRTUAL CONNECTION OR FLOW

BACKGROUND

This invention relates to controlling passage of packets or messages.

As seen in FIG. 1, for example, a simple packet control scheme is sometimes incorporated in a router 18 to protect a network 24 against unwanted packet communication between the network and a device 26 on another network 16. The control scheme is based on the content of the packets 30a–c (FIG. 2), which in the example shown comply with a TCP/IP protocol.

Each packet has customer data bytes 32 encapsulated successively in a TCP envelope that begins with a TCP header 34, an IP envelope that begins with an IP header 36, a data link envelope that begins with a data link header 38, and a physical envelope 40. The data link header 38 includes a data link address 41, protocol type 42 and packet size 43 (sample values of the fields are shown in the bottom row of FIG. 2). The IP header 36 contains an IP destination address 44, an IP source address 46, a length 45, and an ID 47. The TCP header 34 contains a TCP destination port 48, a TCP source address 50, a packet-type 52, an ACK (acknowledge) number 53, a packet sequence number 54, a packet length 55, and a window number 56. Under the TCP/IP protocol, and other connection oriented protocols, a device 12 (FIG. 1) intending to communicate with a device 26 on a protected network, begins communication by sending a packet which is of TCP type SYN (synchronize) and has the identifier of the target device 26 in its TCP destination port field. The packet passes via a router 18 to its destination. If device 26 is willing to communicate with device 12, it responds with a SYN packet to establish a connection. Subsequent packets may be sent back and forth freely through the router. Either device 12 or device 26 can terminate the connection by sending a FIN (finish) packet. RST (reset) packets may also be used to control the connection. The connection context is held in the source and destination devices rather than in the network.

Network 16 typically would also carry packets directed to destinations other than on network 24. One job of the router 18 is to receive packets 30a–c on link 20 from network 16 and to forward them to network 24. As seen in FIG. 3, the router conceptually may include a comparator 60 which determines whether a packet's data link header type 42 is in a protocol table 62. The protocol table contains a pre-stored list of protocols (e.g., TCP/IP) valid for use on network 24. A second comparator 64 may determine whether the packet's IP destination address 44 and, in some cases, the TCP destination port 48 are in a destination address table 66, which contains a pre-stored list of addresses valid for network 24. The router may also have a third comparator 68 which determines if the packet's IP source address 46 and the TCP source address 50 are in a source address table 70, which contains a pre-stored list of source addresses which are not allowed to communicate with network 24.

If a packet has the correct protocol and has acceptable destination and source addresses, e.g. packet 30c (FIG. 1), the router allows it to pass via a simple gate 69 and a link 22 to network 24. These fast and simple comparisons are applied to all data packets whether or not they are SYN or FIN packets. Similar processing may be applied by router 18 for packets passing from network 24 to network 16 using similar comparators and tables 27 interacting with link 22.

Because it screens packets flowing between networks, a router is an example of a broader class of so-called packet filters. Another kind of security device, called an application level gateway or more commonly a firewall, provides richer control of packet flow in a somewhat different way. As shown in FIG. 4, firewall 88 is linked to both networks via links 20, 22 and a router 18. Instead of providing a direct connection for packet flow between the networks, as the router of FIG. 1 does, permitted communications between the networks are handled by setting up two independent TCP/IP connections, one maintained with network 16 by a packet communicator 91, the other one maintained with network 24 by a second packet communicator 93. The firewall repeats permitted packets going each direction from one connection to the other.

Typically, when a SYN packet reaches the firewall, it is examined by a rules processor 90 which determines whether the information in the packet satisfies rules contained in an allow rules table 92 and a deny rules table 94. The allow rules and deny rules are used to test information contained in each packet as well as system information, such as time of day, to determine whether to allow or refuse to set up connections for packet communication between the source and destinations.

The allow rules and deny rules may specify, for source users and destination users: (1) the time and date intervals when a rule should apply; (2) the types of services allowed (e.g., FTP puts and gets, Telnet, and Gopher); (3) special services allowed; (4) types of authentication (e.g., Security Dynamics ACE/Server, Bellcore S/Key, Gateway password); and (4) alert thresholds, which define the number of attempted accesses in violation of the rule per unit of time before an alert message is generated.

The rules processor uses the allow rules and deny rules together, for example, to grant access to a class of users but deny access to a particular user or users otherwise granted access by the allow rules. The rules processor applies the allow rules and deny rules to connection type packets (e.g., a SYN packet) that reach the firewall. Once the rules are satisfied and the two connections are established, other non-connection-management packets may be copied from one connection to the other without extensive rule testing. Additional information about firewalls is contained in *Installation Guide and Configuration Guide, The Eagle Integrated Enterprise Network Security Systems*, published in 1995 by Raptor Systems Incorporated, 69 Hickory Drive, Waltham, Mass. 02154, incorporated by reference.

SUMMARY

In general, in one aspect, the invention features a method for controlling passage of packets or messages between a device and a network via a virtual connection or flow which conforms to a predefined communication protocol. In connection with processing a packet or message that triggers a step in managing the virtual connection or flow, predefined authorization rules are applied to determine whether to permit the step to occur. In connection with processing a packet or message that does not trigger a step in managing the virtual connection or flow, the packet or message is permitted to pass directly via the virtual connection or flow, without applying the predefined authorization rules.

Implementations of the invention may include one or more of the following. The step of managing the virtual connection may include setting up the virtual connection or terminating the virtual connection. Information may be maintained on the state of virtual connections. The packet that triggers a step in managing the virtual connection may include information indicating the step to be taken, such as a type field in a TCP/IP packet.

The authorization rules may include rules intended to prevent unwanted communication with the network, such as rules that check a destination field in the packet against stored permitted destinations or rules that check a source field in the packet against stored permitted sources. The authorization rules may include rules that check services that are permitted to be supplied for a source/destination, and may include specification of alert thresholds.

The protocol may be a TCP/IP protocol.

Information may be logged about packets as they are processed. The logged information may include a source address, a destination address, a sequence number, and an amount of data transferred.

In general, in another aspect, the invention features apparatus including an authorization processor that applies the predefined screening rules, and a router that permits a packet or message to pass directly via the virtual connection or flow, without having the predefined screening rules applied, if the packet or flow is one that does not trigger a step in managing the virtual connection. In implementations, the authorization processor may be connected to a router. The device may be on a second network. The router may be connected to the device and to the network.

Advantages of the invention may include one or more of the following.

The opportunities for control of communication are richer and finer grained than in typical routers, and the average overhead per packet associated with rules processing is lower than in typical firewalls. Rules processing is essentially limited only to those packets associated with initiating or terminating a connection. Packets sent after the connection is made are subjected to minimal additional processing. Packets not associated with setting up or terminating a connection are processed essentially as fast as in traditional routers. Off-the-shelf routers may be used with only minimal modification.

Other advantages and features of the invention will become apparent from the following description and the claims.

DESCRIPTION

Figure 1:
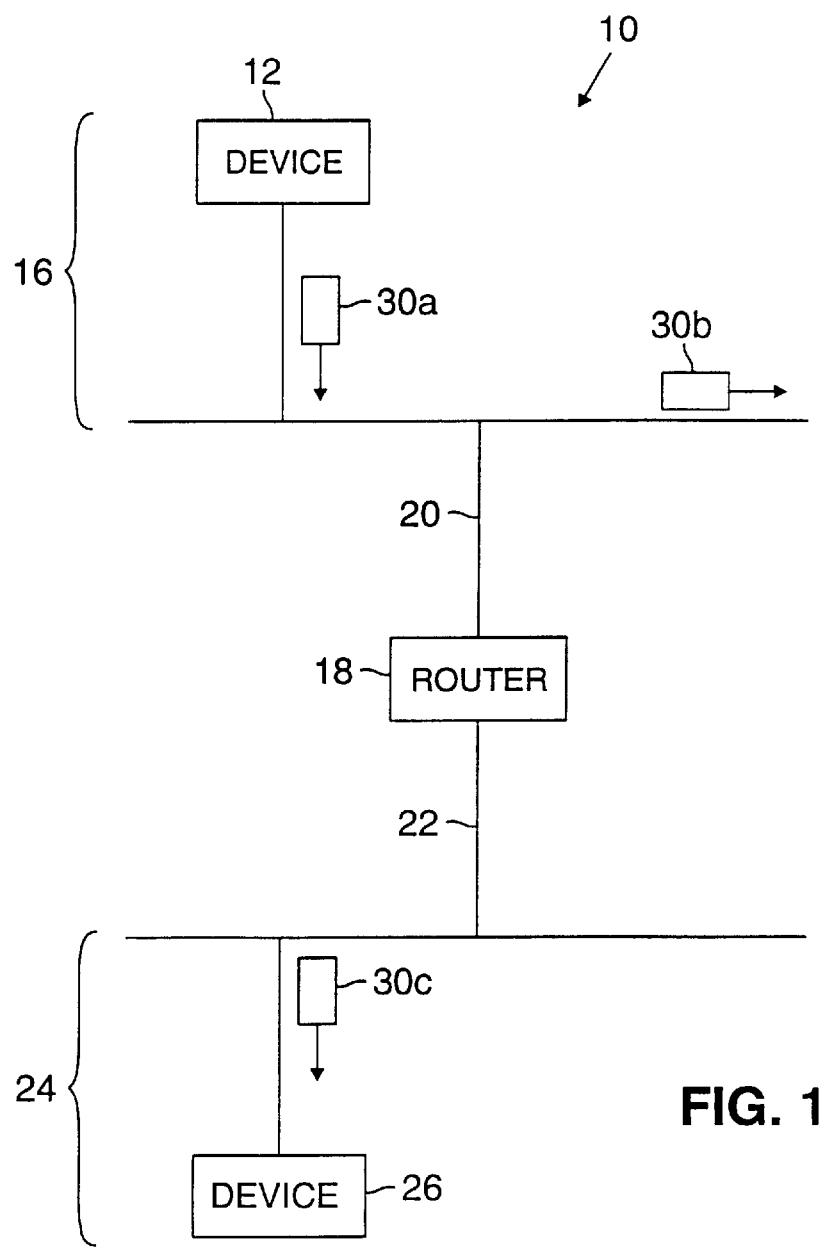
FIG. 1 is a block diagram of networks.
Figure 2:
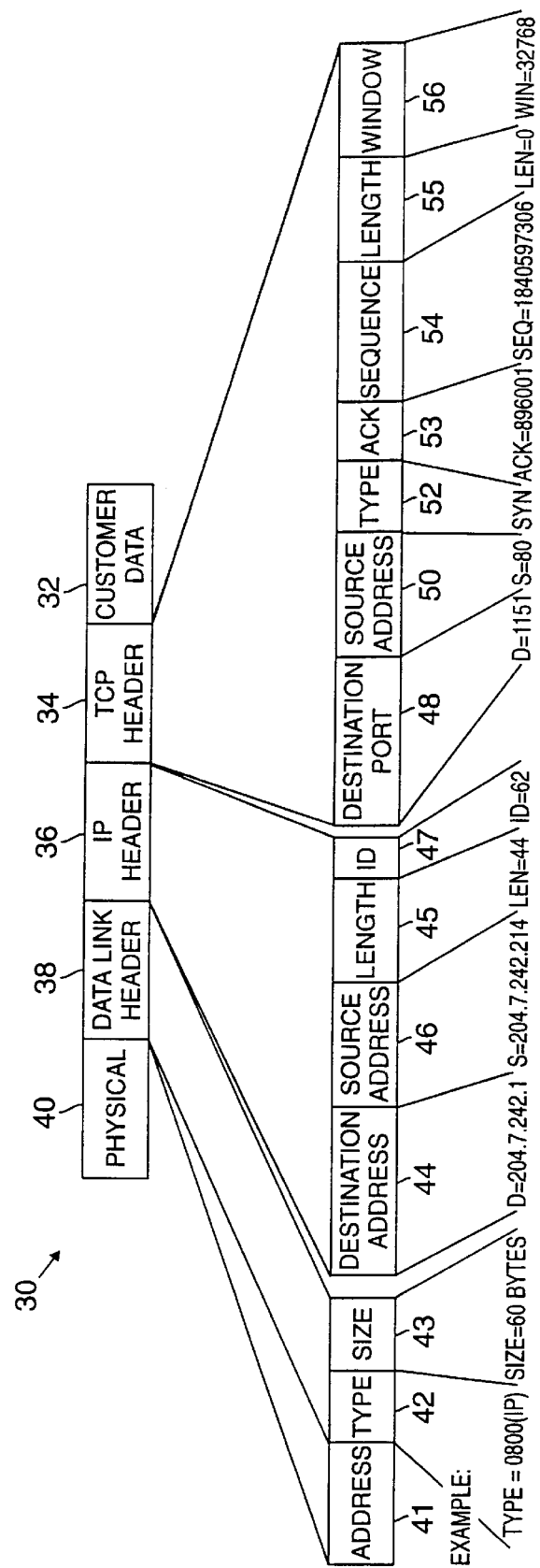
FIG. 2 is a diagram of a packet.
Figure 5:
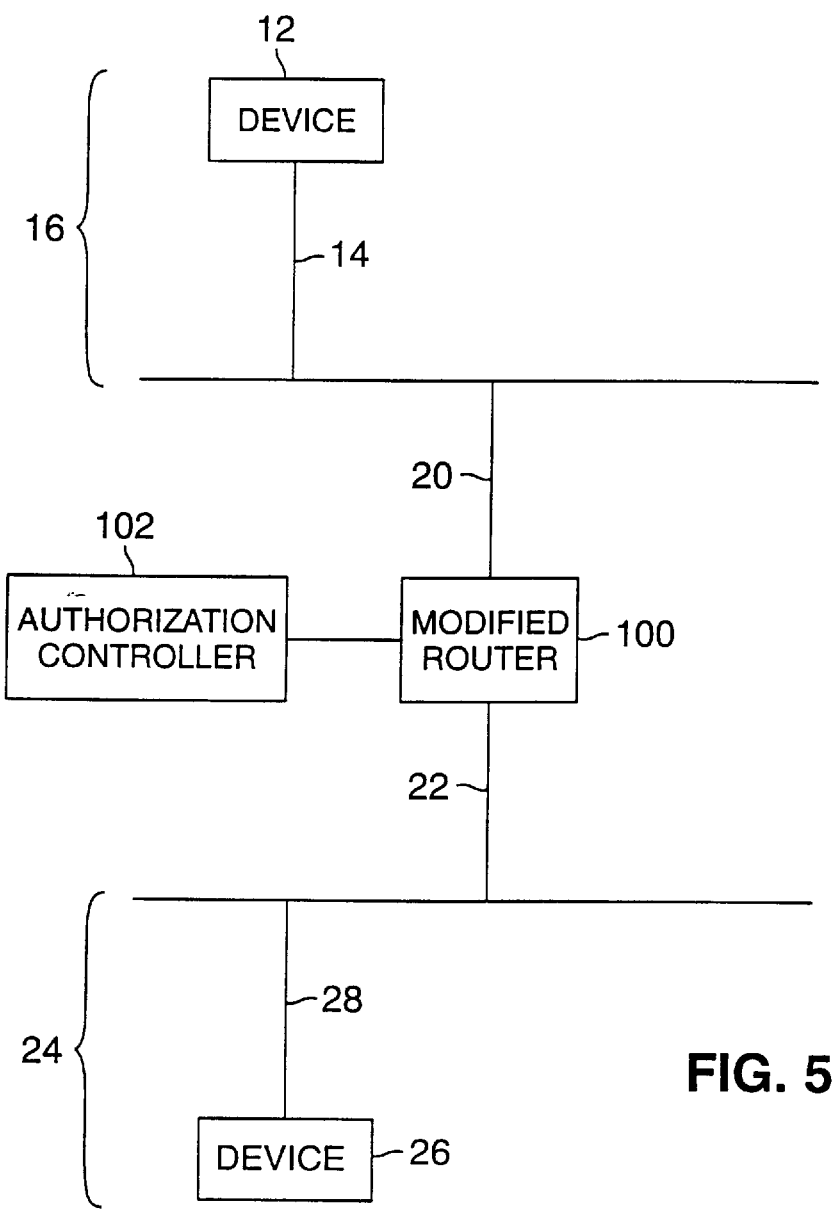
FIG. 5 is a diagram of networks.

As shown in FIG. 5, in an example of the invention a modified router 100 replaces router 18 (FIG. 1), and an authorization controller 102 is attached to a network port of the modified router. Generally, the modified router passes to the authorization controller only packets of types (e.g., SYN, FIN) which relate to setting up, terminating, and otherwise managing a packet connection. The authorization controller applies firewall-type tests and instructs the modified router to forward or not forward the packet depending on the outcome of the tests. Once a connection is established between the source and destination devices, packets are passed through the router at essentially the usual high speed of a router and without requiring that they be repeated from one connection to another as would be the case in a typical firewall.

Figure 3:
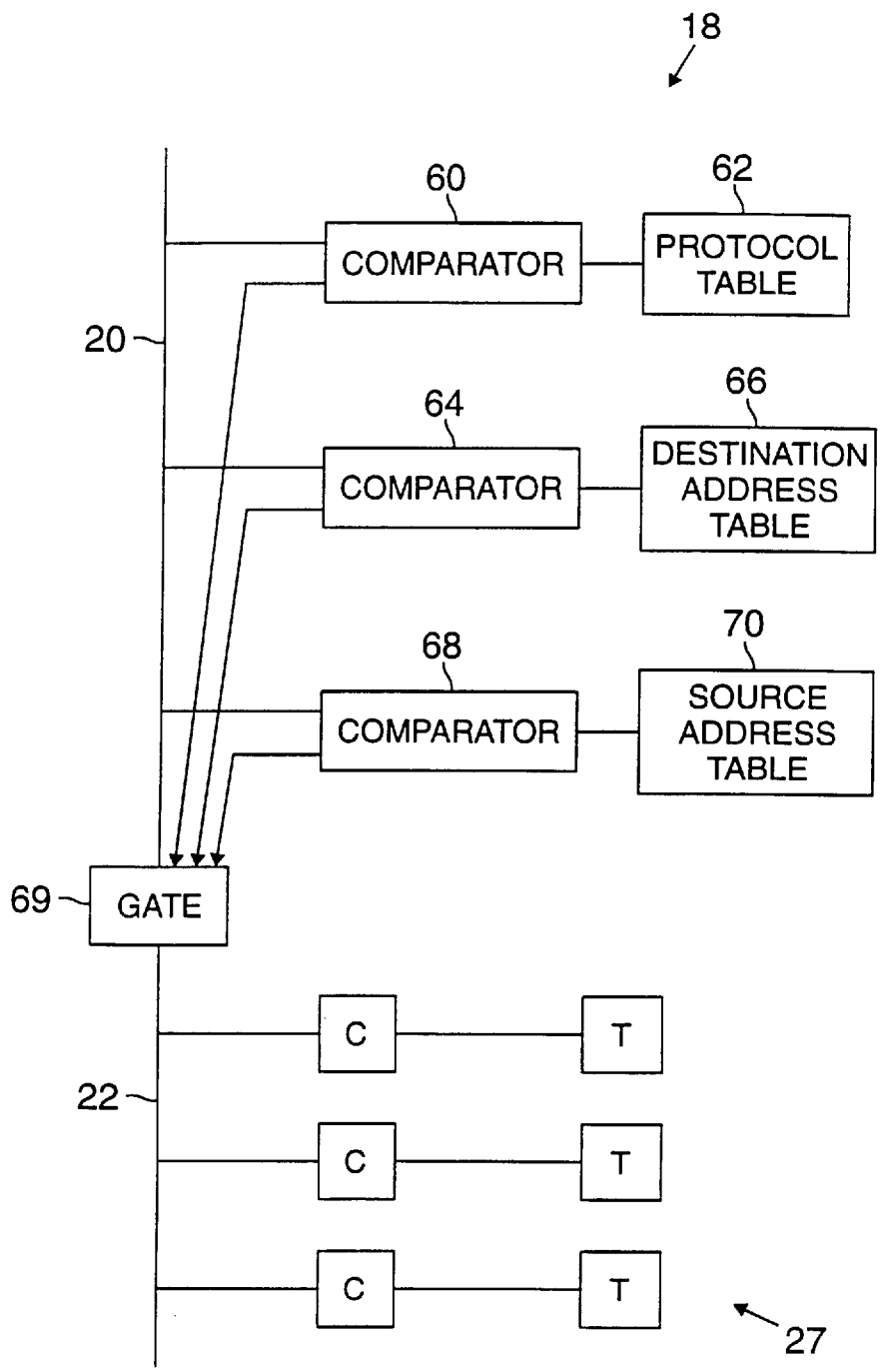
FIG. 3 is a diagram of a router.
Figure 6:
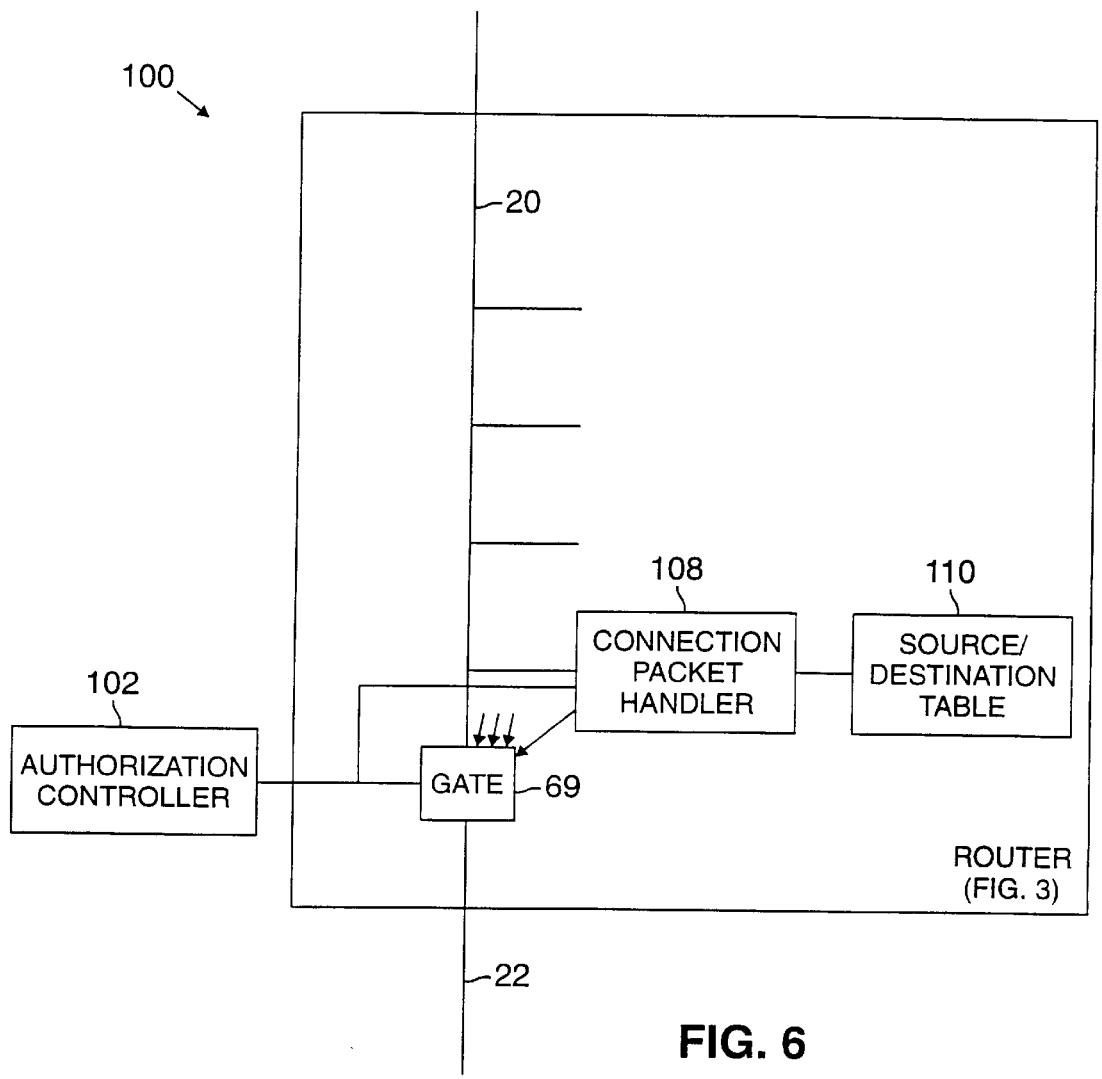
FIG. 6 is a diagram of a router.
Figure 7:
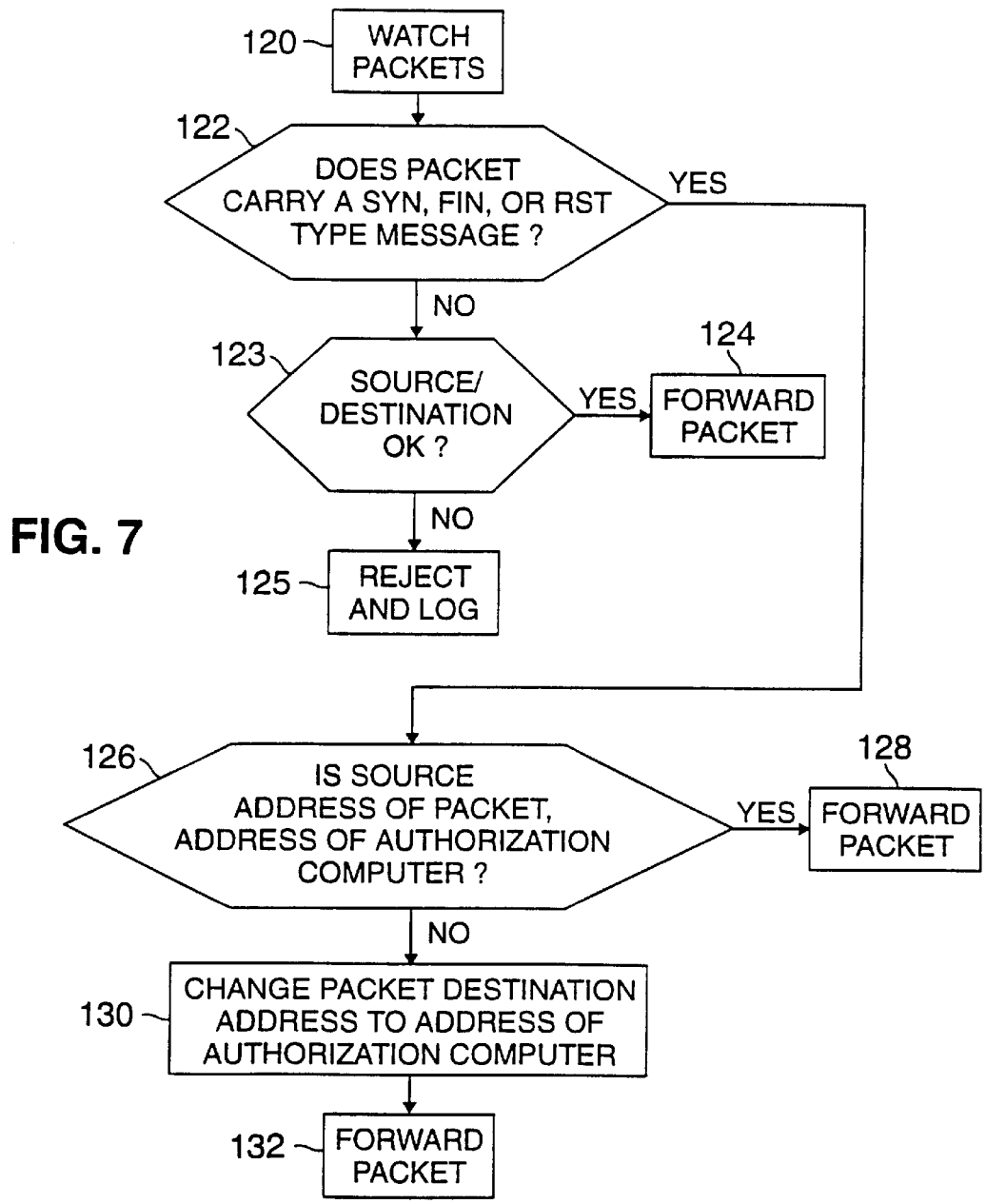
FIG. 7 is a flow chart.

In the modified router (FIG. 6), the router of FIG. 3 is supplemented by a connection packet handler 108 connected to link 22 (a similar handler—not shown—could also be attached to handle packets on link 22). The connection packet handler 108 watches 120 (FIG. 7) packets passing on link 20 for those of types involved in setting up and terminating connections (e.g., SYN, FIN, and RST packets). If a packet is not a connection type packet 122 and if its source address (and in some routers its source and destination address combination) matches 123 one of the sources (or source/destination combinations) in a source/destination table 110, the connection packet handler adds its approval to the inputs of gate 69, and forwards 124 the packet quickly to its destination. If the source (or source/destination) does not match, the packet is rejected 125 and a record is made of the event. If the packet is of the connection-type and the data link source address is the address of the authorization computer 126 (indicating that the source computer is intending to communicate with a device on one of the networks), the packet is forwarded 128 to the destination. For a connection-type packet which is not from the authorization computer, the connection packet handler 108 changes 130 the data link destination address to the address associated with the authorization controller and forwards 132 the packet to the authorization controller 102. This enables the authorization controller to take charge of dealing with the creation, maintenance, and termination of connections based on applicable rules.

Figure 4:
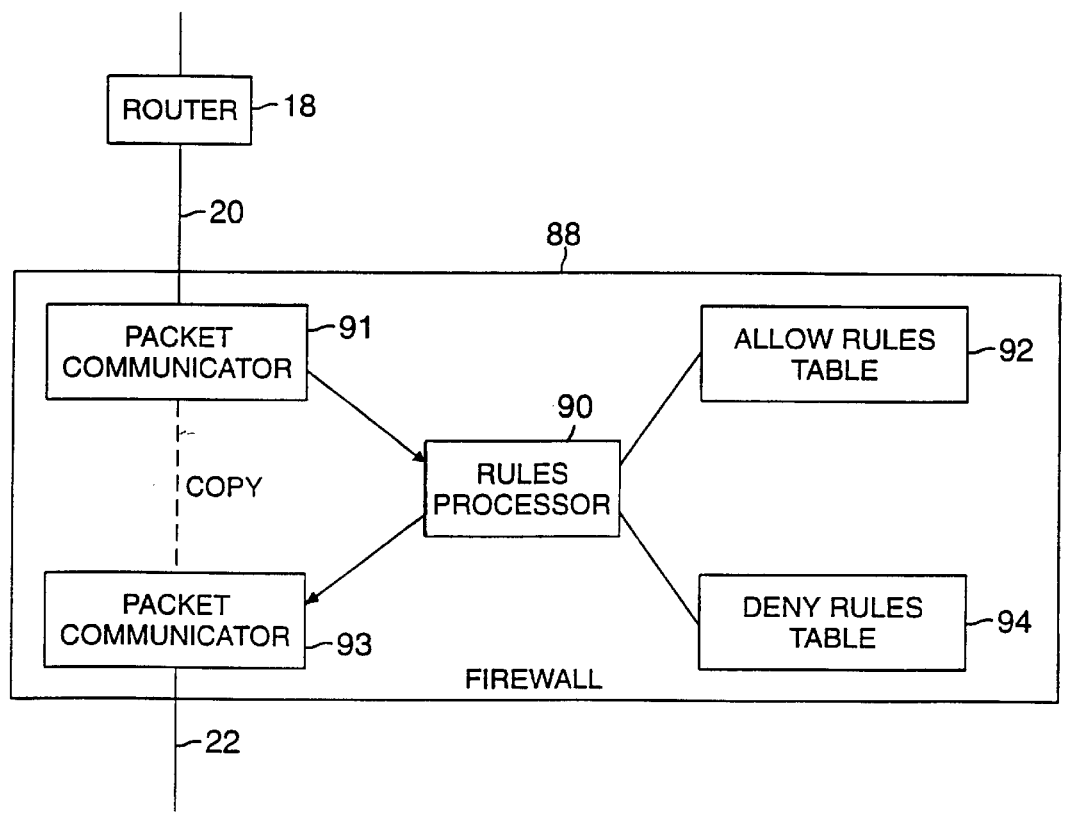
FIG. 4 is a diagram of a firewall.
Figure 8:
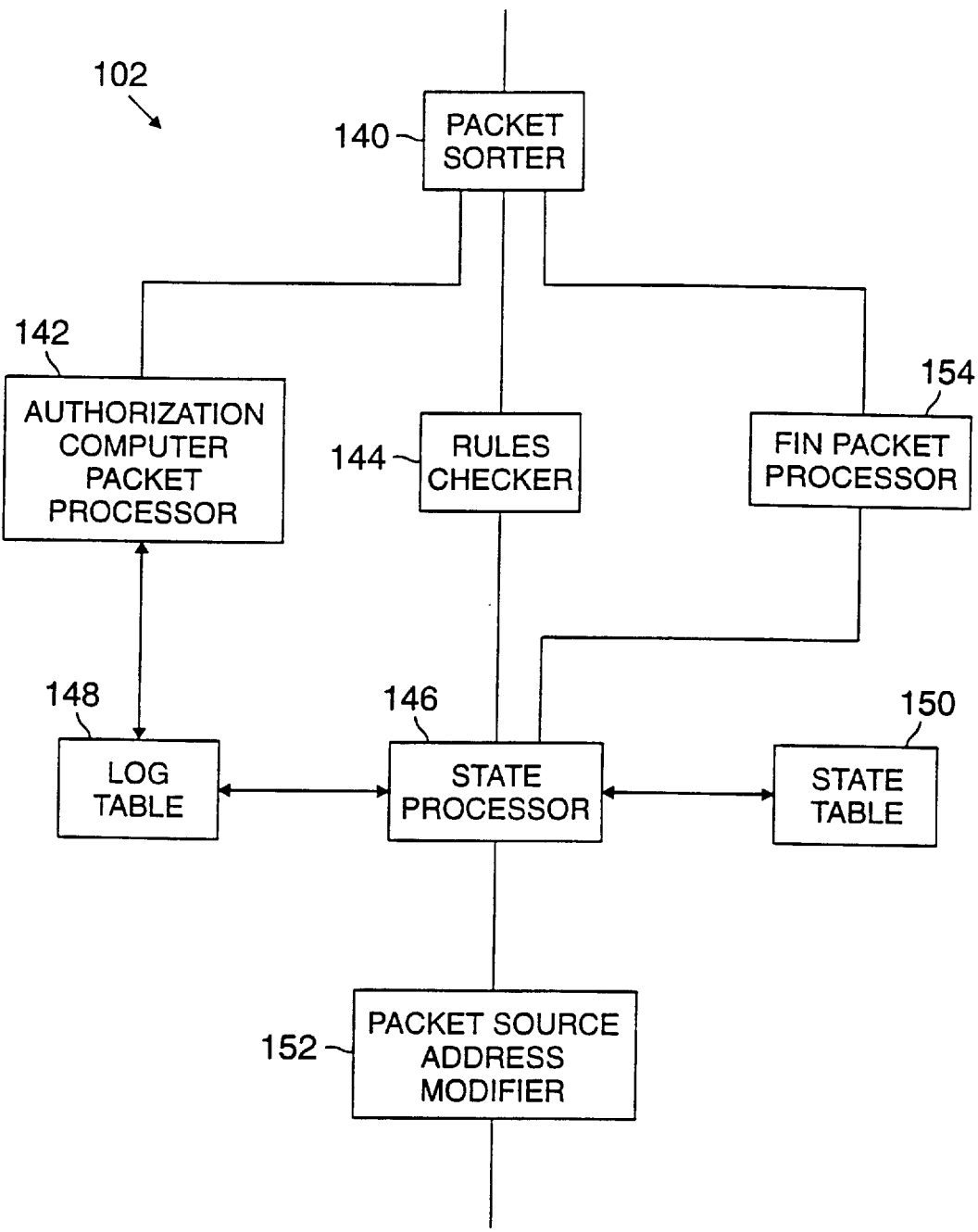
FIG. 8 is a diagram of an authorization controller.
Figure 9:
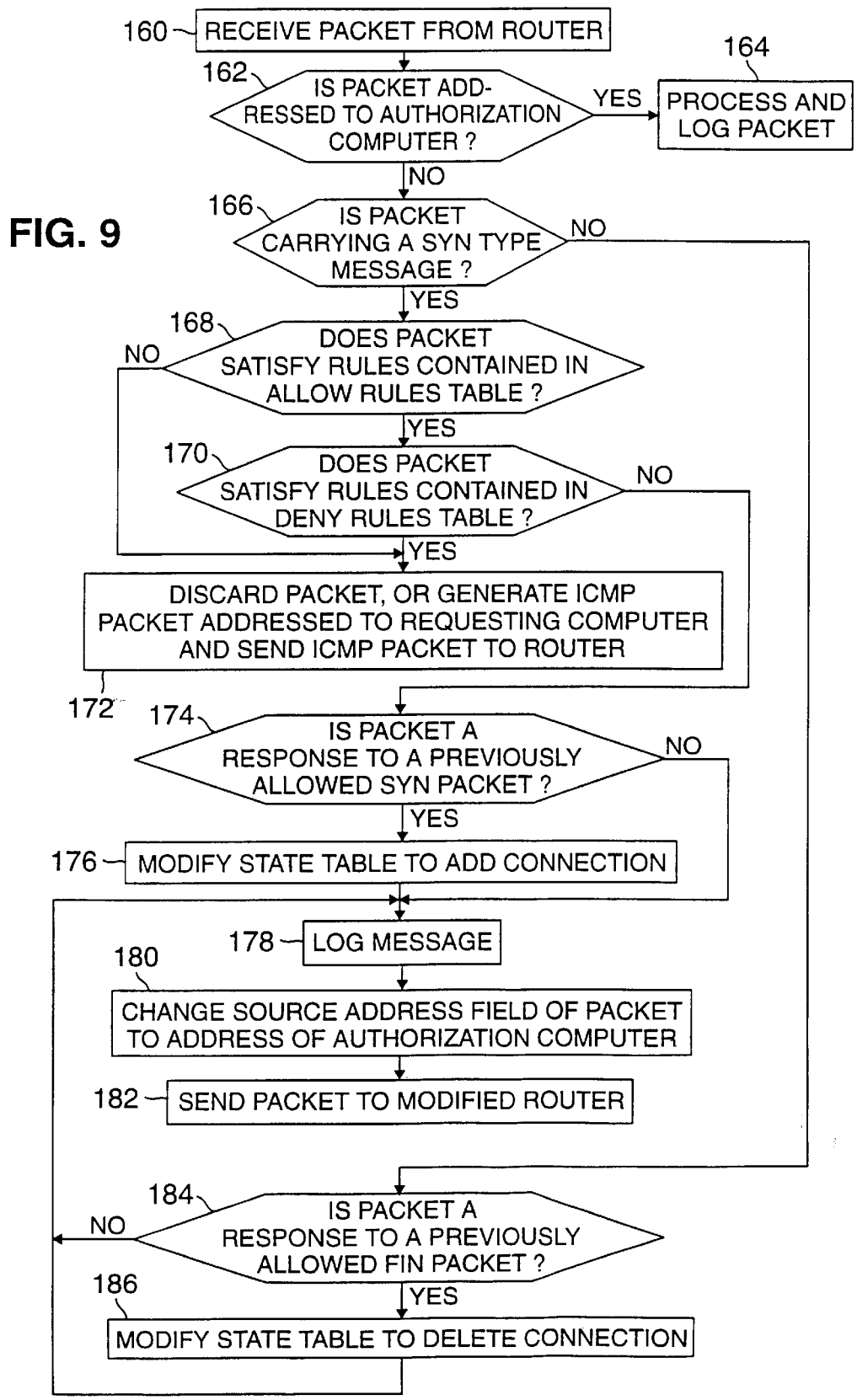
FIG. 9 is a flow chart.

Conceptually, in the authorization controller, FIG. 8, a packet sorter 140 receives 160 (FIG. 9) each packet from the modified router and routes it as follows. If the packet is addressed 162 to the authorization computer, it is routed to an authorization computer processor 142 which processes the packet and logs it 164 in a log table 148. Each entry in the log table contains the IP and TCP source and destination addresses of the packet, the sequence number, and the amount of data transferred with each packet. If the packet is a SYN packet, it is passed to a rules checker 144, which (like some firewall processors) tests 168, 170 the packet against the rules contained in an allow rules table and a deny rules table. The rules processing would be similar to what is discussed above for FIG. 4. The rules checker discards nonconforming packets or sends them 172 to the modified router to be forwarded to device 12 with a message indicating that the connection failed 172.

The rules checker forwards to a state processor 146 each packet which satisfies the rules. If the packet is a SYN packet, the state processor determines 174 whether it is a response to another SYN packet by checking the log table 148 for an entry showing an unanswered SYN packet from device 26 to device 16. If one exists, the state processor updates 174 the state table 150, which contains a list of all active connections between networks, to show the existence of a connection between device 26 and device 16.

The packet sorter sends FIN packets to a FIN packet processor 154. The FIN packet processor sends the packets to the state processor 146. The state processor determines 184 if the FIN packet is a response to a previously allowed FIN packet (indicating that device 12 and device 26 have agreed to terminate their communications session) by looking in the log table 148 for a FIN packet from device 26. If so, the state processor modifies 186 the state table to delete the connection between device 12 and device 26. The state processor logs 178 each packet in the log table, and passes the packet to a packet source address modifier 152, which modifies 180 the data link address of the packet to be that of the authorization computer. The authorization controller then sends 182 the packet to the modified router. The modified router forwards the packet to network 24 via link 22 (even though it is a SYN or FIN packet) because the packet now has the data link address of the authorization controller as its source address.

A non-SYN or non-FIN packet is sent through the router without rules checking or involvement by the authorization controller. If such a packet is not associated with a valid existing connection, the destination device will not accept it because the serial number carried in the packet will not square with the state of the destination device.

Other embodiments are within the scope of the following claims. For example, the authorization processor 102 may be attached directly to network 24 thereby freeing one of the modified router's network ports. Such a configuration provides less security to network 24 because messages which satisfy the traditional router functions will penetrate to the network even though they will eventually fail the rules test applied by the authorization processor. Such a penetration creates the possibility of a user outside network 14 "spoofing" or pretending to be the authorization processor.

The invention could be applied to any connection oriented protocol (as distinguished from a datagram-oriented protocol), including asynchronous transfer mode (ATM) schemes which are known already to use ancillary processes in setting up connections or flows using out-of-band connection messages and identifying best routes. In ATM schemes, the connection state is held in the network, rather than at the source and destination.

What is claimed is:

1. A method for controlling a virtual connection or flow of packets or messages between a device and a network which conforms to a predefined communication protocol, comprising:

examining a packet or message for network protocol information that indicates if the packet or message triggers a step in managing a virtual connection or flow;

if the packet or message triggers a step, identifying the step from the packet or message network protocol information and applying predefined authorization allow and deny rules that indicate whether destination access should be denied to determine whether to permit the step to occur;

if application of the authorization allow and deny rules permit a step that starts a virtual connection or flow, setting up the virtual connection or flow and updating information on the state of virtual connections or flows;

if application of the authorization allow and deny rules permit a step that terminates a virtual connection or flow, terminating the virtual connection or flow and updating information on the state of virtual connections or flows; and if the packet or message does not trigger a step, permitting the packet or message to pass directly via the virtual connection or flow, without applying the predefined authorization allow and deny rules.

2. The method of claim 1 further comprising in connection with processing a packet or message, determining whether it is a packet or message that triggers a step in managing the virtual connection or flow, the determination being made only on the basis of information in the packet.

3. The method of claim 1, wherein the authorization allow and deny rules comprise rules that use information specifying time intervals that specify when a rule should apply to determine whether to deny access.

4. The method of claim 1, wherein the authorization allow and deny rules comprise rules that use information specifying types of services allowed to determine whether to deny access.

5. The method of claim 1, wherein the authorization allow and deny rules comprise rules that use information specifying types of authentication to determine whether to deny access.

6. The method of claim 1, wherein the authorization allow and deny rules comprise rules that use alert thresholds to determine whether to deny access.

7. The method of claim 1, wherein the communication protocol comprises a TCP/IP communication protocol.

8. The method of claim 7, wherein the triggering steps comprise TCP/IP packet types of at least one of the following: SYN, FIN, and RST.

9. The method of claim 1, further comprising maintaining information on the state of virtual connections.

10. The method of claim 1, wherein the authorization allow and deny rules include rules that check a destination field in the packet against stored permitted destinations.

11. The method of claim 1, wherein the authorization allow and deny rules include rules that check services that are permitted to be supplied for a source/destination pair.

12. The method of claim 1, wherein the authorization allow and deny rules include specification of alert thresholds.

13. The method of claim 1 also including logging information about packets as they are processed.

14. The method of claim 13, wherein the logged information comprises a source address, a destination address, a sequence number, and an amount of data transferred.

* * * * *